United States Patent [19]

Golsch

[11] Patent Number: 4,932,480

[45] Date of Patent: Jun. 12, 1990

[54] DRIVING TOOL WITH AIR-COOLED BUMPER

[75] Inventor: Rudolph A. M. Golsch, Arlington Heights, Ill.

[73] Assignee: Illinois Tool Works Inc., Glenview, Ill.

[21] Appl. No.: 285,733

[22] Filed: Dec. 16, 1988

[51] Int. Cl.[5] .............................................. B23B 45/16

[52] U.S. Cl. .................................... 173/139; 227/130; 227/156

[58] Field of Search ................. 173/139; 227/130, 156

[56] References Cited

U.S. PATENT DOCUMENTS

| | | | |
|---|---|---|---|
| Re. 32,452 | 7/1987 | Nikolich | 123/46 |
| 3,496,840 | 2/1970 | Wandel et al. | 92/85 |
| 3,552,274 | 1/1971 | Bojan et al. | 91/416 |
| 3,815,475 | 6/1974 | Howard et al. | 91/399 |
| 3,817,091 | 6/1974 | Frederick | 173/139 X |
| 3,969,989 | 7/1976 | Maurer et al. | 92/85 |
| 4,206,687 | 6/1980 | Klaus et al. | 91/395 |
| 4,401,251 | 8/1983 | Nikolich | 227/130 |
| 4,441,644 | 4/1984 | Farian | 227/130 |
| 4,475,680 | 10/1984 | Farian | 227/130 |
| 4,509,669 | 4/1985 | Elliesen | 227/130 |

FOREIGN PATENT DOCUMENTS 1496295 12/1977 United Kingdom .

*Primary Examiner*—Frank T. Yost
*Assistant Examiner*—Willmon Fridie, Jr.
*Attorney, Agent, or Firm*—Dressler, Goldsmith, Shore, Sutker & Milnamow, Ltd.

[57] ABSTRACT

A driving tool comprising a cylinder, a piston movable axially within the cylinder, a driving element movable conjointly with the piston so as to move through a central aperture of an end wall of the cylinder in a driving stroke and in a return stroke, and a bumper, which arrests movement of the piston toward the end wall of the cylinder in a driving stroke. The bumper is made of resilient material, such as cast polyurethane, in an annular shape. The bumper has a plurality of slots extending radially from each of its inner and outer peripheral surfaces and extending axially between its opposite ends. Each of a plurality of ports in a wall of the cylinder, either the end wall or a cylindrical wall, communicates with a space between the piston and the end wall and with one of the slots to cause air to pass through the communicating slots before being exhausted through the ports in a driving stroke and after being admitted through the ports in a return stroke. Air passing through the communicating slots helps to cool the bumper.

6 Claims, 3 Drawing Sheets

DRIVING TOOL WITH AIR-COOLED BUMPER

TECHNICAL FIELD OF THE INVENTION

This invention pertains to a driving tool, such as a pneumatically actuated fastener-driving tool, which comprises an air-cooled bumper.

BACKGROUND OF THE INVENTION

Typically, a pneumatically actuated fastener-driving tool, such as a pneumatically actuated nail-driving tool or a pneumatically actuated staple-driving tool, comprises a cylinder, a piston movably axially within the cylinder, and a driving element movable conjointly with the piston. The driving element, which may also be called a driver blade, moves through a central aperture of a end wall of the cylinder in a driving stroke of the piston and in a return stroke of the piston. The piston is arranged to be forcibly moved toward the end wall having the central aperture in a driving stroke and to be oppositely moved in a return stroke. In a driving stroke of the piston, the driving element moves along a drive track and drives a fastener, such as a nail or staple fed into the drive track from a magazine containing a strip or coil of collated fasteners, into a workpiece. Such a tool is exemplified in Bojan et al. U.S. Pat. No. 3,552,274 and in Howard et al. U.S. Pat. No. 3,815,475.

Typically, such a tool also comprises a resilient or elastomeric bumper, which arrests axial movement of the piston in a driving stroke. As exemplified in Wandel et al. U.S. Pat. No. 3,496,840 and in British Patent Specification No. 1,496,295 to Signode Corporation, it is known for such a bumper to have chamfers, axial flutes along an outer surface, or axial bores, which affect its response to heavy impacts, and which affect air circulation along its outer surfaces.

Ideally, such a bumper should exhibit high tensile strength, high elongation to breakage, high tear strength, high fatigue strength, low hysteresis, and low changes in modulus over a wide range of operating temperatures, which can range from about −20° F. to about 200° F. It is difficult to optimize such properties in such a bumper, which typically is made of a resilient or elastomeric material, such as a natural or synthetic rubber.

For such bumpers, cast polyurethanes have superior properties, as compared to other natural or synthetic materials, except that strength values of cast polyurethanes drop rapidly when their temperatures remain elevated for prolonged periods, particularly but not exclusively as a consequence of internal material friction due to repeated impacts over short intervals of time. Strength values of other materials used for such bumpers tend to be similarly affected by elevated temperatures.

Accordingly, there has been a need heretofore for a better way to cool such a bumper, particularly but not exclusively such a bumper made of a cast polyurethane.

SUMMARY OF THE INVENTION

This invention provides a driving tool, as exemplified by a pneumatically actuated fastener-driving tool, which comprises an air-cooled bumper. Broadly, along with the bumper, the driving tool comprises a cylinder, a piston movable axially within the cylinder, and a driving element movable conjointly with the piston. The driving element moves through an open center of the bumper, and through a central aperture of an end wall of the cylinder, in a driving stroke of the piston and in a return stroke of the piston. The piston is arranged to be forcibly moved, as by air pressure, toward the end wall of the cylinder in a driving stroke and to be oppositely moved, as by air pressure, in a return stroke.

The bumper, which is similar to prior bumpers in that it arrests axial movement of the piston in a driving stroke, and in that it is made of a resilient or elastomeric material, such as a cast polyurethane, in an annular shape, differs from prior bumpers in that it has a plurality of passageways, which extend to at least one of its opposite ends, preferably to both such ends, and some of which communicate with a plurality of ports in a cylindrical wall of the cylinder, or the end wall of the cylinder with the central aperture noted above, so as to cause air to pass through the communicating slots before being exhausted through the ports in a driving stroke of the piston and after being admitted through the ports in a return stroke of the piston. Air passing through the communicating slots helps to cool the bumper.

Preferably, the passageways are slots, although it is envisioned that passageways of different forms, such as bores, may be instead used, so long as air must pass therethrough.

In a preferred form, the bumper has a plurality of slots extending radially from its inner peripheral surface and a plurality of slots extending radially from its outer peripheral surface, each slot extending axially between the opposite ends of the bumper and terminating in and communicating with a bore extending axially between the opposite ends of the bumper.

Preferably, the driving tool is similar to pneumatically actuated fastener-driving tools of a well known type in that the ports noted above are located in a cylindrical wall of the cylinder and communicate with an outer chamber, within which exhausted air is compressed in a driving stroke of the piston, and from which compressed air is admitted through the ports so as to urge the piston in a return stroke. It is known to augment exhausted air compressed within the outer chamber, in a return stroke of the piston, by pressurized air from an external source; see, e.g., Bojan et al. U.S. Pat. No. 3,552,274 and Howard et al. U.S. Pat. No. 3,815,475.

Alternatively, and particularly but not exclusively if the piston is a differential diameter or spool piston, as exemplified in Klaus et al. U.S. Pat. No. 4,206,687, the ports noted above may be instead located in the end wall having the central aperture for the driving element.

As compared to prior bumpers without such slots, a bumper according to this invention tends to be better ventilated, so as to remain cooler, and tends to suppress more noise and to exhibit less fatigue, even if exposed to repeated impacts over short intervals of time.

Although this invention has particular utility when embodied in a pneumatically powered fastener-driving tool, it is envisioned that this invention also may be advantageously embodied in a combustion-powered fastener-driving tool, as exemplified in Nikolich U.S. Pat. Re. 32,452, or in a driving tool of a different type, such as a chisel-driving tool or even as a shock-absorbing piston-cylinder assembly comprising analogous elements.

These and other objects, features, and advantages of this invention are evident from the following description of a preferred embodiment of this invention with reference to the accompanying drawings.

DETAILED DESCRIPTION OF THE PREFERRED EMBODIMENT

Figure 1:
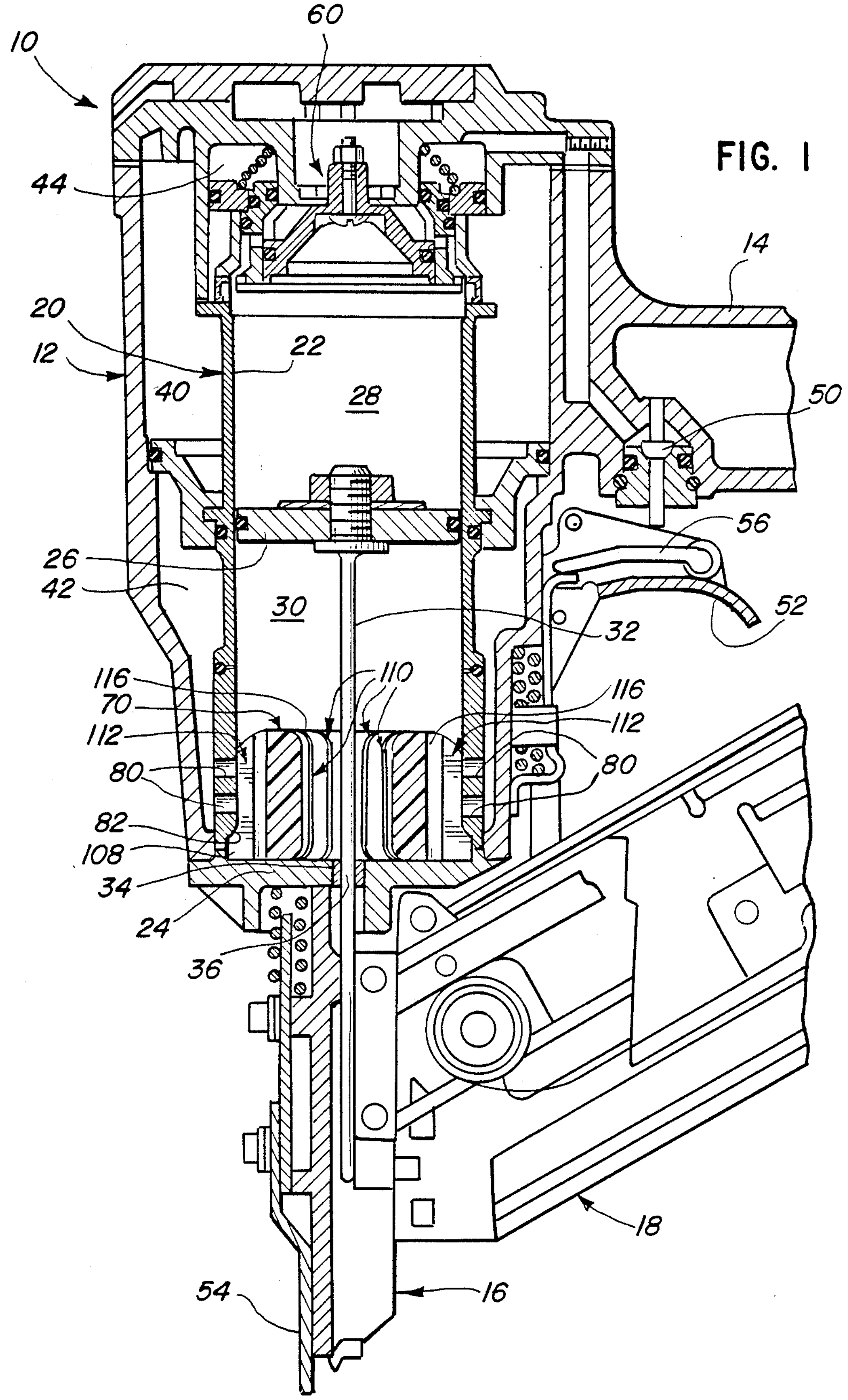
FIG. 1 is a partly fragmentary, axial cross-sectional view of a pneumatically powered fastener-driving tool constituting a preferred embodiment of this invention, the tool being shown in FIG. 1 in a convenient orientation.
Figure 2:
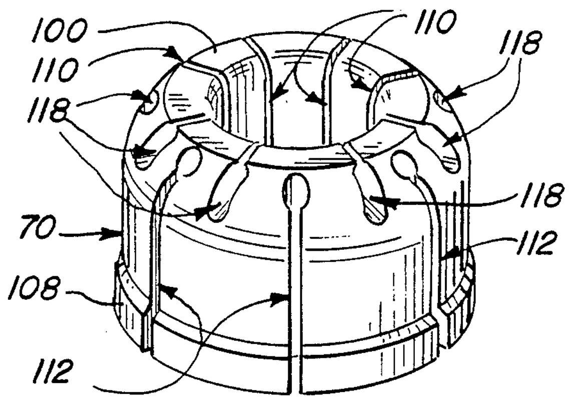
FIG. 2 is a perspective view of an improved bumper used in the tool of FIG. 1.
Figure 3:
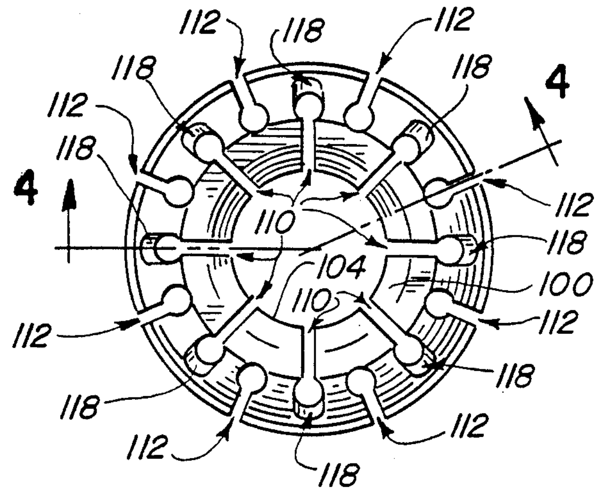
FIG. 3 is an axial plan view of the upper end of the bumper of FIG. 2.
Figure 4:
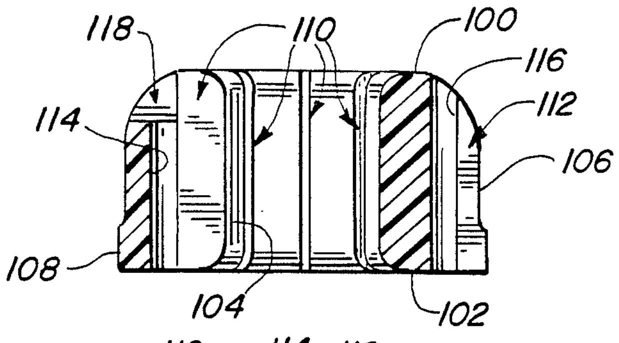
FIG. 4 is a sectional view taken along line 4—4 of FIG. 3 in directions indicated by arrows.
Figure 5:
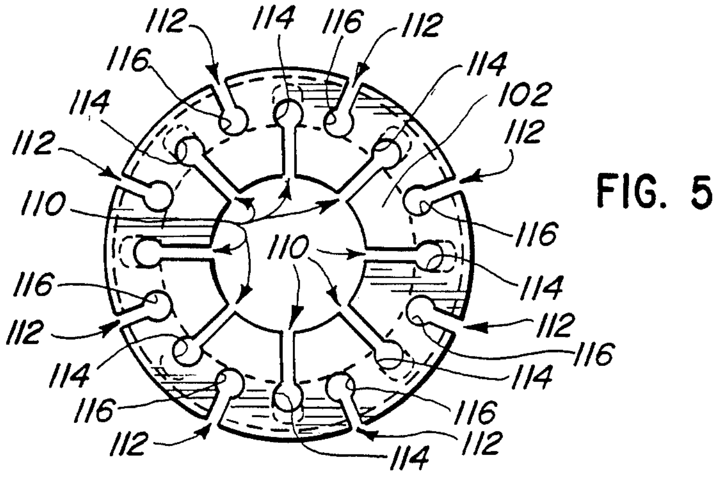
FIG. 5 is an axial plan view of the lower end of the bumper FIG. 2.

In the following paragraphs, a preferred embodiment of this invention and an alternative embodiment of this invention are described, each as shown in the drawings in a convenient orientation. Directional terms, such as "upper", "lower", "upwardly", and "downwardly", are used for convenient reference to such an orientation and are not intended to limit this invention to any particular orientation.

As shown in FIG. 1, this invention may be advantageously embodied in a pneumatically powered nail-driving tool 10 of a well known type comprising a main housing 12, which has a handle portion 14, a nosepiece 16, which is attached to the main housing 12 so as to extend downwardly from the main housing 12, and a magazine 18, which holds a strip (not shown) of collated nails. Except for its novel features described below, the tool 10 is similar to Paslode TM Model 5300S Series Strip Nailers made and sold heretofore by ITW Paslode (Paslode Corporation) of Lincolnshire, Illinois. Hence, except for the novel features, a brief description of the tool 10 and its operation is deemed sufficient.

The nosepiece 16 defines a drive track for guiding a nail being driven by the tool 12. The magazine 18 has an internal mechanism for feeding one nail at a time into the drive track of the nosepiece 16. The nosepiece 16 and the magazine 18 are similar to the nosepieces and magazines used in Paslode TM Model 5300S Series Strip Nailers noted above. Precise details of the nosepiece 16 and magazine 18 are outside the scope of this invention.

The main housing 12 defines a cylinder 20, which has a cylindrical wall 22 and an end wall 24, which closes its lower end as shown. A piston 26 is movable axially within the cylinder 20 between an uppermost position and a lowermost position. The piston 26 is shown in FIG. 1 in an intermediate position between its uppermost and lowermost positions. The piston 26 is arranged in a known manner to be forcibly moved by air pressure toward the end wall 24, from its uppermost position to its lowermost position, in a driving stroke of the piston 26 and to be oppositely moved by air pressure in a return stroke of the piston 26. The piston 26 may be generally regarded as dividing the cylinder 20 into a space 28 of variable volume above the piston 26 and a space 30 of variable volume below the piston 26. According to well known principles, differences between air pressure in the space 28 and air pressure in the space 30 cause the piston 26 to move upwardly or downwardly within the cylinder 20.

The tool 10 also comprises a driving element or driver blade 32. The driving element 32 extends axially from the piston 26, and downwardly as shown, through a hardened steel sleeve 34 lining a central aperture 36 in the end wall 24. In a driving stroke of the piston 26, the driving element 32 drives a nail from the drive track of the nosepiece 16 into a workpiece (not shown) such as wooden pieces being nailed together.

The main housing 12 also defines several annular chambers, which are adapted to store air under high pressure, namely, a chamber 40 surrounding an upper portion of the cylinder 20, a chamber 42 surrounding a lower portion of the cylinder 20, and a chamber 44 being disposed in an upper portion of the main housing 12. Herein, in specific reference to their main functions, it is convenient to refer to the chamber 40 as the upper piston-controlling chamber 40, to refer to the chamber 42 as the lower piston-controlling chamber 42, and to refer to the chamber 44 as the main valve-controlling chamber 44.

According to well known principles, air under high pressure, so-called "live" air, is supplied continuously to the tool 10 during its operation, from an external source (not shown) such as an air compressor. Live air enters the tool 10 through a coupling (not shown) on the handle portion 14 and charges the upper piston-controlling chamber 40.

A trigger-actuatable valve 50, which is mounted operatively in the handle portion 14, is arranged to allow live air to charge the main valve-controlling chamber 44, unless the valve 50 is actuated. The valve 50 is arranged to vent the chamber 41 to the outer atmosphere when the valve 50 is actuated. A manually actuatable trigger 52 is mounted operatively to the main housing 12, beneath the handle portion 14, and a workpiece-engaging actuator 54 is mounted operatively to the nosepiece 16. The actuator 54 is linked operatively to a lever 56, which is mounted pivotally to the trigger 52. The valve 50, trigger 52, and actuator 54 are arranged, in a well known manner, so that the valve 50 is actuated if and only if the trigger 52 is actuted manually and the actuator 54 is pressed firmly, as against a workpiece, so as to lift the lever 56. The actuator 54 is spring-biased so as not to lift the lever 56 unless the actuator 54 is pressed firmly. The valve 50, trigger 52, and actuator 54 are similar to the trigger-actuatable valves, manually actuatable triggers, and workpiece-engaging actuators used in Paslode TM 5300S Series Strip Nailers noted above. Precise details of the valve 50, trigger 52, and actuator 54 are outside the scope of this invention.

A main valve 60, which is mounted operatively in the upper portion of the main housing 12, controls air pressure in the space 28 above the piston 26. The valve 60, which has two stages, is controlled by air pressure in the main valve-controlling chamber 44. The valve 60 is arranged to vent the space 28 to the outer atmosphere, and to block air from entering the space 28 from the upper piston-controlling chamber 40, whenever the chamber 44 is charged with live air. The valve 60 is arranged to seal the space 28 from the outer atmosphere, and to admit live air from the chamber 40 into the space 28, whenever the chamber 44 is vented to the outer atmosphere. The valve 60 is similar to the main valves used in Paslode TM 5300S Series Strip Nailers noted above. Precise details of the valve 60 are outside the scope of this invention.

Moreover, the tool 10 comprises a bumper 70, which is fitted within the cylinder, so as to fit against the end wall 24. The bumper 70 is made of a resilient or elastomeric material, such as a cast polyurethane, in an annular shape, which allows the driving element 32 to pass through the bumper 70 in a driving stroke of the piston 26 and in a return stroke of the piston 26. The bumper 70 is similar to prior bumpers in that the bumper 70 arrests movement of the piston 26 towards the end wall 24 in a driving stroke of the piston 26.

Although annular bumpers made of similar materials are used in Paslode TM 5300S Series Strip Nailers noted above, the bumper 70 has novel features, as described below, and cooperates with ports in the cylindrical wall 22 in a novel manner, as described below.

The lower piston-controlling chamber 42 communicates with the space 30 below the piston 26 through a plurality of ports 80 in the cylindrical wall 22. Eight ports 80 are arranged one above another in pairs (two pairs being shown) at 90° intervals around the cylindrical wall 22. Below the ports 80, the cylindrical wall 22 has an annular recess 82, for a purpose to be later described.

Air being compressed by the piston 26 in a driving stroke of the piston 26 is exhausted through the ports 80 from the space 30 into the lower piston-controlling chamber 42, in which such air is stored temporarily. Conversely, in a return stroke of the piston 26, air stored in the chamber 42 is admitted through the ports 80 from the chamber 42 into the space 30, in which such air expands so as to move the piston 26 upwardly. Air being compressed by the piston 26 in the space 28 in a return stroke of the piston 26 is vented through the main valve 60 to the outer atmosphere.

Although ports are provided for a similar purpose in Paslode TM 5300S Series Strip Nailers noted above, the ports 80 cooperate with the bumper 70 in a novel manner, as described below.

In order to operate tool 10, after the tool 10 has been connected to an external source of live air and a nail has been fed into the drive track of the magazine 18, a user actuates the manual trigger 52 manually and presses the workpiece-engaging actuator 54 firmly against a workpiece, whereupon the trigger-actuatable valve 50 vents the main valve-controlling chamber 44 to the outer atmosphere. As soon as the chamber 44 is vented to the outer atmosphere, the main valve 60 allows air under high pressure from the upper piston-controlling chamber 40 to enter the space 28 above the piston 26. Air entering the space 28 from the chamber 40 expands in the space 28 so as to move the piston 26 forcibly toward the end wall 24, in a driving stroke of the piston 26, which compresses air in the space 30 below the piston 26 as the piston 26 is moved toward the end wall 24. Air being compressed by the piston 26 in the space 30 is exhausted through the ports 80 into the lower piston-controlling chamber 42, in which such air is stored temporarily. The sleeve 34 lining the central aperture 36 in the end wall 24 minimizes air leakage around the driving element 32.

As soon as the manual trigger 52, the workpiece-engaging actuator 54, or both, have been released, the trigger-actuatable valve 50 allows live air again to charge the main valve-controlling chamber 34. As soon as the chamber 44 is recharged with live air, the main valve 60 vents the space 28 above the piston 26 to the outer atmosphere and blocks air from entering the space 28 from the upper piston-controlling chamber 40, whereupon the air stored in the lower piston-controlling chamber 42 is admitted through ports 80 into the space 30 below the piston 26. Air admitted from the chamber 32 through the ports 80 expands in the space 30 so as to move the piston 26 upwardly in a return stroke of the piston 26. Air being compressed by the piston 26 in the space 28 in a return stroke of the piston 26 is vented via the valve 60 to the outer atmosphere.

Generally, the operation of the tool 10, as described in the preceding several paragraphs, is similar to the operation of Paslode TM 5300S Series Strip Nailers noted above. Further details of the tool 10 and its operation, except as described below, are outside the scope of this invention.

This invention utilizes air being exhausted through the ports 80 in a driving stroke of the piston 26 and air being admitted through the ports 80 in a return stroke of the piston 26 to cool the bumper 70 in a novel manner.

As shown in FIGS. 2 through 5, the bumper 70 having an annular shape, as mentioned above, has an upper end 100, a lower end 102, an inner peripheral surface 104, and an outer peripheral surface 106. The bumper 70 has an annular flange 108 extending outwardly at its lower end 102. The annular flange 108 fits into the annular recess 82 in the cylindrical wall 24, when the bumper 70 is fitted within the cylinder 20, so as to secure the bumper 70 against the end wall 24. The inner peripheral surface 104 is cylindrical, except at its upper and lower ends, which are rounded as shown. The outer peripheral surface 106 is cylindrical, except at an upper portion, which is curved as shown.

The bumper 70 has eight slots 110 extending radially from the inner peripheral surface 104 and eight slots 112 extending radially from the outer peripheral surface 106. Each of the slots 110, 112, extends axially between the upper end 100 and the lower end 102. Each of the slots 110 terminates in and communicates with a bore 114 extending axially between the upper end 100 and the bottom end 102. Each of the slots 112 terminates in and communicates with a bore 116 extending axially between the upper end 100 and the bottom end 102. Each of the bores 114 communicating with the slots 110 extending radially from the inner peripheral surface 104 terminates in and communicates with a notch 118, which is wider than any of the slots 110, 112, and which opens at the curved, upper portion of the outer peripheral surface 106. The bores 114 and the bores 116 are arranged alternatingly, in a circular array, at 22.5° intervals. Thus, the slots 110 are arranged at 45° intervals, and the slots 112 are arranged at 45° intervals.

Herein, all references to "slots" are to be broadly construed to cover slots having parallel sides, as shown, vee-shaped slots, axial flutes, and other slot-like openings.

The bumper 70 is fitted within the cylinder 20 so that the outer peripheral surface 106 fits snugly within the cylindrical wall 22, and so that each of the ports 80 communicates with one of the slots 112 extending radially from the outer peripheral surface 106, whereby air must pass through the slots 112 communicating with the ports 80 before being exhausted through the ports 80 in a driving stroke of the piston 26 and after being admitted through the ports 80 in a return stroke of the piston 26. Air passing through the slots 112 communiating with the ports 80 helps to cool the bumper 70.

The slots 110, 112, and the bores 114, 116, provide the bumpers 70 with an enlarged surface area, which also helps to cool the bumper 70. Heat generated by internal material friction due to repeated impacts of the piston 26 on the bumper 70 over short intervals of time is dissipated over the enlarged surface area. Some of the generated heat is transferred to air passing through the slots 112 communicating with the ports 80.

The slots 110, 112, and the bores 114, 116, provide the bumper 70 with a favorable shape, from a standpoint of stress-related fatigue. As compared to a bumper without such slots and such bores, the bumper 70 tends to distribute impact stresses more uniformly and to exhibit less fatigue due to impact stresses.

Because heat build-up and stress-related fatigue are reduced markedly, the bumper 70 tends to exhibit a significantly longer life, as compared to a bumper without such slots and such bores.

Moreover, the bumper 70 tends to suppress more noise, as compared to a bumper without such slots and such bores.

Figure 6:
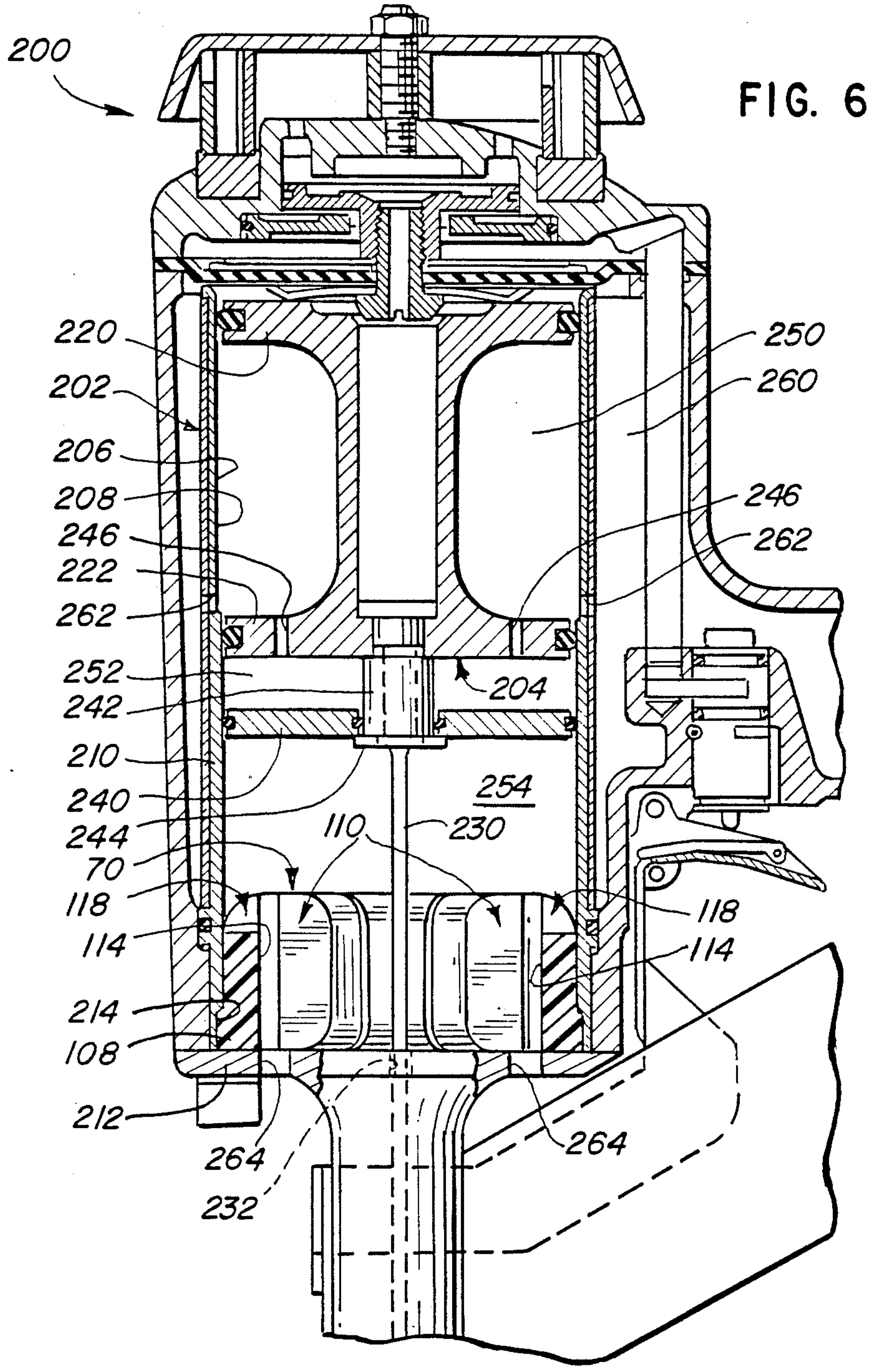
FIG. 6 is a partly fragmentary, axial cross-sectional view of a pneumatically powered fastener-driving tool constituting an alternative embodiment of this invention, the tool being shown in FIG. 6 in a convenient orientation.

As shown in FIG. 6, this invention may be alternatively embodied in a pneumatically powered nail-driving tool 200 of a type exemplified in FIG. 1 of Klaus et al. U.S. Pat. No. 4,206,687. Thus, the tool 200 comprises a stepped cylinder 202, within which a differential diameter or spool piston 204 is moved axially.

The cylinder 202 has a stepped, cylindrical wall 206, which includes an upper portion 208 of a larger diameter and a lower portion 210 of a smaller diameter, and has an end wall 212 at its lower end as shown. The cylindrical wall 206 has an annular recess 214, at its lower end as shown, for a purpose to be later described.

The piston 204 has an upper flange 220 of a larger diameter and a lower flange 222 of a smaller diameter. The piston 204 is arranged to be forcibly moved toward the end wall 212 in a driving stroke of the piston 204 and to be oppositely moved in a return stroke of the piston 204.

A driving element or driver blade 230 extends axially from the piston 204, and downwardly as shown, so as to be conjointly movable with the piston 204. The driving element 230 passes through a central aperture 232 in the end wall 212 in a driving stroke of the piston 204 and in a return stroke of the piston 204. In a driving stroke of the piston 204, the driving element drives a nail (not shown) into a workpiece (not shown) in a known manner.

A disc 240 is mounted for axial movement along an upper cylindrical portion 242 of the driving element 230, between the lower flange 222 of the piston 204 and an annular shoulder 244, which is mounted rigidly beneath the upper cylindrical portion 242. The lower flange 222 of the piston 204 is provided with axial ports 246, through which an annular space 250 between the piston flanges 220, 222, communicates with a space 252 of variable volume between the disc 240 and the lower flange 222 of the piston 204. A space 254 of variable volume is defined below the disc 240.

The tool 200 comprises an annular chamber 260, which surrounds the cylinder 202, and which communicates with the annular space 250 between the piston flanges 220, 222, through radial ports 262 in the lower portion 210 of the cylindrical wall 206. The end wall 212 is provide with axial ports 264, which vent the space 254 below the disc 240 to the outer atmosphere. Four ports 264 are provded (two being shown) at 90° intervals in a circular array. A greater or lesser number of such ports may be alternatively provided.

When live air is applied to the upper face of the upper flange 220 of the piston 204 in a known manner, the piston 204 is moved forcibly toward the end wall 212 in a driving stroke of the piston 204. Air being compressed in the space 254 below the disc 240 is exhausted through the ports 264 to the outer atmosphere.

The bumper 70, which is used in the preferred embodiment of FIG. 1, is used also in the alternative embodiment of FIG. 6. The bumper 70, which is fitted within the cylinder 202, arrests axial movement of the piston 204 toward the end wall 212 in a driving stroke of the piston 204. Initially, in a driving stroke of the piston 204, the disc 240 strikes the bumper 70 so as to be upwardly lifted along the upper cylindrical portion 242 of the driving element 230. Air being compressed by the disc 240 in the space 252 between the disc 240 and the lower flange 222 of the piston 204 is exhausted through the ports 246 into the annular space 250, from which some of such air is exhausted through the ports 262 into the annular chamber 260, thereby to cushion the impact of the piston 204 and the disc 240.

In a return stroke of the piston 204, air pressure in the annular space 250 is increased in a known manner, so as to move the piston 204 upwardly. Air then is admitted from the outer atmosphere into the space 254 beow the disc 240 through the ports 264.

Generally, the operation of the tool 200, as described above, is similar to the operation of the tool exemplified in FIG. 1 of Klaus et al. U.S. Pat. No. 4,206,687 wherein reference also is made to Howard et al. U.S. Pat. No. 3,815,475. Further details of the tool 200 and its operation, except as described below, are outside the scope of this invention.

When the bumper 70 is fitted within the cylinder 202, the annular flange 108 of the bumper 70 fits into the annular recess 214 in the cylindrical wall 206, so as to secure the bumper 70 against the end wall 212. Moreover, each of the ports 264 communicates through one of the bores 114 with one of the slots 110 extending radially from the inner peripheral surface 104 of the bumper 70, whereby air must pass through the slots 110 communicating with the ports 264 before being exhausted through the ports 264 in a driving stroke of the piston 204 and after being admitted through the ports 264 in a return stroke of the piston 204. Air passing through the slots 110 communicating with the ports 264 helps to cool the bumper 70.

In other respects, the bumper 70 functions in the alternative embodiment of FIG. 6 as the bumper 70 functions in the preferred embodiment of FIG. 1, so as to reduce heat buildup and stress-related fatigue.

Various other modifications may be also made in the driving tool embodying this invention without departing from the scope and spirit of this invention.

I claim:

1. A driving tool comprising:

(a) a cylinder, which has a cylindrical wall and an end wall, the end wall having a central apertures, one of said walls having a plurality of ports;

(b) a piston, which is movable axially within the cylinder, and which is arranged to be forcibly moved toward the end wall of the cylinder in a driving stroke of the piston and to be oppositely moved in a return stroke of the piston;

(c) a driving element, which extends axially from the piston so as to be conjointly movable with the piston, and so as to pass through the central aperture of the end wall of the cylinder in a driving stroke of the piston and in return stroke of the piston;

(d) a bumper, which is made of a resilient material in an annular shape with opposite ends, with an open center, and with an outer peripheral surface and an inner peripheral surface, and which is fitted within the cylinder and between the piston and the end wall of the cylinder so that the driving member moves through the open center of the bumper in a driving stroke of the piston and in a return stroke of the piston, and so that the bumper arrests movement of the piston toward the end wall of the cylinder in a driving stroke of the piston;

wherein said ports exhaust air from a space between the piston and the end wall of the cylinder in a driving stroke of the piston and admit air into the space between the piston and the end wall of the cylinder in a return stroke of the piston; and wherein the bumper has a plurality of slots extending radially from each peripheral surface and extending axially between the opposite ends of the bumper and is fitted so that each port communicates with one of said slots to cause air to pass through the slots communicating with said ports before being exhausted through said ports in a driving stroke of the piston and after being admitted through said ports in a return stroke of the piston, whereby air passing through the slots communicating with said ports helps to cool the bumper; and further wherein each slot terminates in and communicates with a bore extending axially between the opposite ends of the bumper.

2. A driving tool comprising:

(a) a cylinder, which has a cylindrical wall and an end wall, the end wall having a central aperture and a plurality of ports;

(b) a piston, which is movable axially within the cylinder, and which is arranged to be forcibly moved in a return stroke of the piston;

(c) a driving element, which extends axially from the piston so as to be conjointly movable with the piston, and so as to pass through the central aperture of the end wall of the cylinder in a driving stroke of the piston and in a return stroke of the piston;

(d) a bumper, which is made of a resilient material in an annular shape with opposite ends, with an open center, and with an outer peripheral surface and an inner peripheral surface, and which is fitted within the cylinder and between the piston and the end wall of the cylinder so that the driving member moves through the open center of the bumper in a driving stroke of the piston and in a return stroke of the piston, and so that the bumper arrests movement of the piston toward the end wall of the cylinder in a driving stroke of the piston;

wherein said ports exhaust air from a space between the piston and the end wall of the cylinder in a driving stroke of the piston and admit air into the space between the piston and the end wall of the cylinder in a return stroke of the piston; and wherein the bumper has a plurality of slots extending radially from the inner peripheral surface and extending axially between the opposite ends of the bumper and is fitted so that each port communicates with one of said slots to cause air to pass through the slots communicating with said ports before being exhausted through said ports in a driving stroke of the piston and after being admitted through said ports in a return stroke of the piston, whereby air passing through the slots communicating with said ports helps to cool the bumper; and further wherein the bumper has a plurality of slots extending radially from the outer peripheral surface and extending axially between the opposite ends of the bumper.

3. The driving tool of claim 2 wherein each slot terminates in and communicates with a bore extending axially between the opposite ends of the bumper.

4. A driving tool comprising:

(a) a cylinder, which has a cylindrical wall and an end wall, the end wall having a central aperture, the cylindrical wall having a plurality of ports;

(b) a piston, which is movable axially within the cylinder, and which is arranged to be forcibly moved toward the end wall of the cylinder in a driving stroke of the piston and to be oppositely moved in a return stroke of the piston;

(c) a driving element, which extends axially from the piston so as to be conjointly movable with the piston, and so as to pass through the central aperture of the end wall of the cylinder in a driving stroke of the piston and in a return of the stroke of the piston;

(d) a bumper, which is made of a resilient material in an annular shape with opposite ends, with an open center, and with an outer peripheral surface and an inner peripheral surface, and which is fitted within the cylinder and between the piston and the end wall of the cylinder so that the driving member moves through the open center of the bumper in a driving stroke of the piston and in a return stroke of the piston, and so that the bumper arrests movement of the piston toward the end wall of the cylinder in a driving stroke of the piston;

wherein said ports exhaust air from a space between the piston and the end wall of the cylinder in a driving stroke of the piston and admit air into the space between the piston and the end wall of the cylinder in a return stroke of the piston; and wherein the bumper has a plurality of slots extending radially from the outer peripheral surface and extending between the opposite ends of the bumper and is fitted so that each prot communicates with one of said slots to cause air to pass through the slots communicating with said ports before being exhausted through said ports in a driving stroke of the piston and after being admitted through said ports in a return stroke of the piston, whereby air passing through the slots communicating with said ports helps to cool the bumper; and further wherein the bumper has a plurality of slots extending radially from the inner peripheral surface and extending radially between the opposite ends of the bumper.

5. The driving tool of claim 4 wherein each slot terminates in and communicates with a bore extending axially between the opposite ends of the bumper.

6. A driving tool comprising:

(a) a cylinder, which has a cylindrical wall and an end wall, the end wall having a central aperture, one of said walls having a plurality of ports;

(b) a piston, which is movable axially within the cylinder, and which is arranged to be forcibly moved toward the end wall of the cylinder in a driving stroke of the piston and to be oppositely moved in a return stroke of the piston;

(c) a driving element, which extends axially from the piston so as to be conjointly movable with the piston, and so as to pass through the central aperture of the end wall of the cylinder in a driving stroke of the piston and in a return stroke of the piston;

(d) a bumper, which is made of a resilient material in an annular shape with opposite ends, with an open center, and with an outer peripheral surface and an inner peripheral surface, and which is fitted within the cylinder and between the piston and the end wall of the cylinder so that the driving member moves through the open center of the bumper in a driving stroke of the piston and in a return stroke of the piston, and so that the bumper arrests movement of the piston toward the end wall of the cylinder in a driving stroke of the piston;

wherein said ports exhaust air from a space between the piston and the end wall of the cylinder in a driving stroke of the piston and admit air into the space between the piston and the end wall of the cylinder in a return stroke of the piston; and wherein the bumper has a plurality of passageways extending from the inner peripheral surface of the bumper and is fitted so that one or more of said ports communicate with one or more of said passageways to cause air to pass through the passageways communicating with said ports before being exhausted through said ports in a driving stroke of the piston and after being admitted through said ports in a return stroke of the piston, whereby air passing through the passageways communicating with said ports helps to cool the bumper; and further wherein each passageway extends to both of the opposite ends of the bumper.

* * * * *

UNITED STATES PATENT AND TRADEMARK OFFICE
CERTIFICATE OF CORRECTION

PATENT NO. : 4,932,480

DATED : June 12, 1990

INVENTOR(S) : Rudolph A. M. Golsch

It is certified that error appears in the above—identified patent and that said Letters Patent is hereby corrected as shown below:

Column 1, line 17, the first "a" should be --an--.

Column 4, line 37, "41" should be --44--.

Column 7, line 67, "provded" should be --provided--.

Column 8, line 27, "beow" should be --below--.

Column 8, line 60 (claim 1) "apertures" should be --aperture--.

Column 10, line 43 (claim 4) "prot" should be --port--.

Signed and Sealed this

Eighth Day of October, 1991

*Attest:*

HARRY F. MANBECK, JR.

*Attesting Officer* *Commissioner of Patents and Trademarks*